April 17, 1945. D. R. DE ROCHE ET AL 2,373,816
CONTINUOUS VULCANIZATION PROCESS AND APPARATUS
Filed Feb. 12, 1942
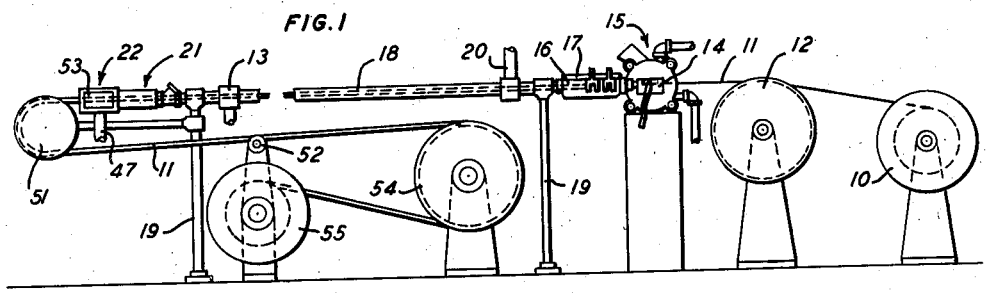
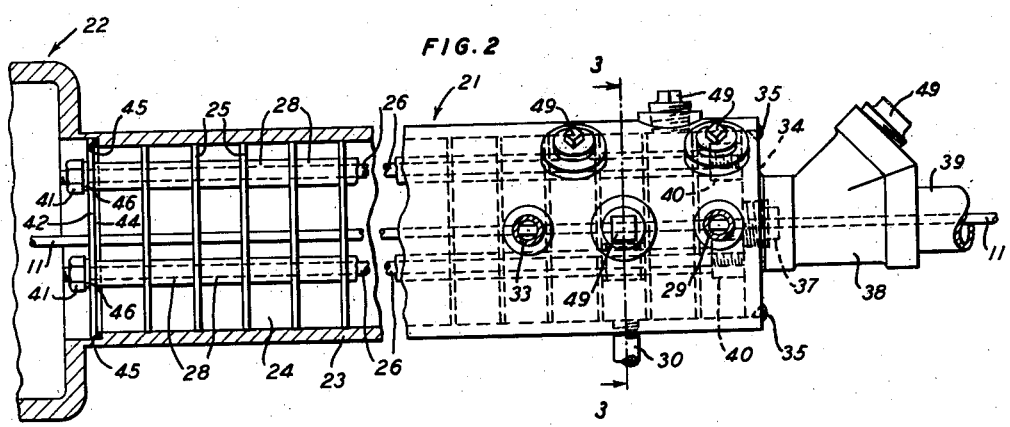
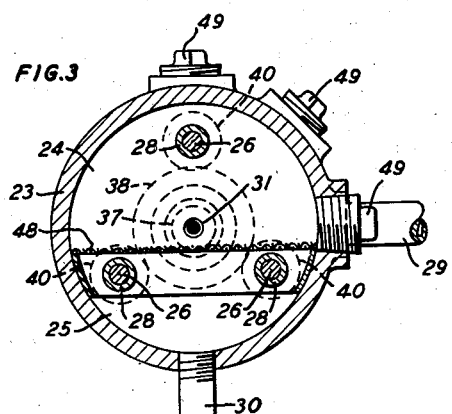
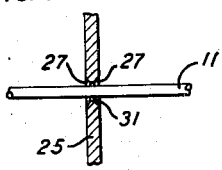
INVENTORS
D. R. DE ROCHE
D. D. JONES
BY
ATTORNEY Patented Apr. 17, 1945

2,373,816

UNITED STATES PATENT OFFICE 2,373,816

CONTINUOUS VULCANIZATION PROCESS AND APPARATUS

Daryl R. De Roche, Baltimore, and Donald D. Jones, Towson, Md., assignors to Western Electric Company, Incorporated, New York, N. Y., a corporation of New York Application February 12, 1942, Serial No. 430,552

8 Claims. (Cl. 18—53)

This invention relates to continuous vulcanization processes and apparatus.

In the manufacture of insulated electrical conductors and especially in the manufacture of said conductors wherein a textile covered conductor is enclosed within a sheath of vulcanized material, a common method of vulcanizing the sheath in situ upon the core is to pass the rubber sheathed conductor through a tubular vulcanizing chamber in which steam under a high pressure is the vulcanizing medium. In order to maintain this high steam pressure, it is necessary that the vulcanizing chamber be sealed to prevent the escape of the steam. Several kinds of seals for this purpose are now in common use, but none of them is entirely satisfactory for all purposes.

A mechanical seal made of rubber backed up by a compressed air ram effectively prevents the escape of steam, but is disadvantageous in that the sudden release of pressure when the vulcanized material enters the atmosphere after passing through the seal at the outlet end of the vulcanizing chamber causes a sudden expansion of the air and water vapor within the rubber covered conductor. Because of the relative thinness of the vulcanized sheath, this sudden expansion of the air and water vapor may rupture or "blow" the enclosing rubber sheath. In certain cases it is necessary to remove water vapor and air from the textile covered wire before applying the sheath in order to prevent this "blowing" of the sheath.

A number of water seals have been developed which were intended to overcome this difficulty. Seals of this type are attached to the end of a vulcanizing chamber and contain water or other liquid at a pressure equal to or greater than that of the vulcanizing medium in order to prevent the escape of the steam. Since the steam pressure employed in continuous vulcanizing apparatus may range from 150 to 250 pounds per square inch, such water seals are expensive to maintain because of the high pressure at which the water must be supplied to the seals to counter-balance this steam pressure.

Objects of applicants' invention are to provide new and improved methods of and apparatus for vulcanizing continuous lengths of vulcanizable material.

In general, the invention relates to continuous vulcanization processes and apparatus, in which the apparatus employed comprises a vulcanizing chamber having a seal consisting of a container for retaining a cooling liquid at a pressure lower than that of the vulcanizing medium in the vulcanizing chamber. A plurality of baffles are positioned within the container and apertures in the baffles are aligned with apertures in either end of the container to provide a passage therethrough for the vulcanized material.

Other objects and features of the invention will appear from the following detailed description, when read in conjunction with the accompanying drawing, wherein Fig. 1 is a side elevation of an apparatus for sheathing wire with a vulcanizable covering and vulcanizing the covering in situ;

Fig. 2 is an enlarged side view of a seal for a vulcanizing chamber having a portion of the wall of the seal broken away;

Fig. 3 is a vertical section of said seal taken on line 3—3 of Fig. 2; and

Fig. 4 is an enlarged, fragmentary cross-section of a baffle forming a part of said seal.

In the drawing, one embodiment of the invention is illustrated which is adapted to cover an electrical conductor, either bare or insulated with textile material, with an insulating coating of vulcanized rubber. The apparatus embodying the invention is provided with a supply reel 10 from which a conductor 11 is withdrawn over a sheave 12 around which the conductor 11 passes. From the sheave 12 the conductor passes through a head 14 of an extrusion mechanism designated generally by the numeral 15, which is adapted to extrude a uniform coating of unvulcanized insulating material, such as a rubber compound, on the conductor as it emerges from the head. The extrusion mechanism 15 may be of any well-known type and is illustrated only diagrammatically, since a complete description of its construction is not essential to fully understand the present invention.

A connecting member 16 effects a pressure-tight connection between the head 14 and a vulcanizing chamber 18, which connecting member is provided with a closure 17 to permit access to the conductor in case of necessity. The vulcanizing chamber 18 is supported by a series of standards 19—19 and is supplied with a heated non-oxidizing vulcanizing medium, such as steam, under pressure through an inlet pipe 20. The water formed by the condensation of steam within the vulcanizing chamber 18 is removed through pipe 13.

At the end of the vulcanizing chamber opposite the entrance end there is provided a seal 21 which permits the covered conductor to be drawn from the chamber, but which prevents the escape of any large quantities of steam from the interior of the chamber. A collecting chamber 22 is provided to collect the water which is ejected from the exit end of the seal 21. The seal 21 (Figs. 2 and 3) comprises a tubular shell 23 forming a wall of a chamber 24 within which are positioned a plurality of baffles 25—25 spaced from one another along supporting rods 26—26 by means of spacers 28—28. Inlet pipes 29 and 33 and an outlet pipe 30 provide means for circulating water or other suitable liquid through the chamber 27. The inlet pipes 29 and 33 may be connected to an ordinary tap water supply pipe.

Each of the baffles 25—25 has a central aperture 31 (Fig. 4) having a low coefficient of discharge and which is just large enough to permit the rubber covered conductor 11 and a thin stream of rapidly moving, cooling liquid, to pass therethrough. The edges 27—27 (Fig. 4) of each aperture 31 are beveled as shown in Fig. 4, to provide as thin an edge as possible for the aperture. A thin-edged aperture is desirable, since such apertures have a low coefficient of discharge.

The coefficient of discharge of an aperture is indicative of the facility with which that aperture permits a fluid to pass therethrough. An aperture having a high coefficient of discharge permits a fluid to pass therethrough readily, and vice versa. The more readily an aperture permits fluid to pass therethrough, the less difference there will be between the fluid pressure on the one side of the aperture and that on the other side. Since thin-edged apertures have much lower coefficients of discharge than thick edged apertures, water passes through them less readily than through thick-edged apertures. Consequently, other conditions being the same, they effect a greater reduction in pressure than do the thick-edged apertures. For this reason, a fewer number of baffles having thin-edged apertures are required to effect a given pressure drop than would be required if the apertures in the baffles were thick-edged. Hence, a shorter seal and more efficient pressure reduction results from the use of the former. It is immaterial for the purposes of this invention whether the thin-edged apertures are obtained by beveling the edges of the apertures in relatively thick walled baffles or by perforating thin walled baffles.

The end of the seal 21 through which the wire enters is closed by a metal plate 34 welded to the shell 23 as shown at 35. To the outer side of the plate 34 is welded a threaded connecting member 38 into which the end 39 of the vulcanizing chamber 18 is threaded. A plug 37, which is welded into an aperture in the plate 34 and which has an opening formed through the center thereof, is provided to permit the passage therethrough of the rubber covered conductor. The right hand ends of the supporting rods 26—26, as seen in Fig. 2, are threaded in socket members 40—40 welded to the inner side of the plate 34. Nuts 41—41 (Fig. 2) are threaded on the opposite end of rods 26—26 to force an end plate 42 against a rubber gasket 44 which rests against a shoulder 45 formed in the end of the shell 23. Lock washers 46—46 (Fig. 2) keep the nuts 41—41 from working loose. An aperture formed in the end plate 42 serves as an outlet for both the conductor and some of the water.

A screen 48 (Fig. 3) is positioned immediately over the water outlet pipe 30 to prevent pieces of rubber or other material from clogging the outlet. A plurality of clean out plugs 49—49 are placed at strategic positions to permit access to the interior of the seal.

The collecting chamber 22 is formed on the end of the seal 21 as shown in Fig. 2. A drain 47 carries away the excess water from the collecting chamber and a closure 53 provides access to the end of the seal 21 which is located within the collecting chamber.

The vulcanized rubber covered conductor 11 leaves the seal 21 and is advanced over a pulley 51 and back over an idler 52 by means of a capstan 54 around which the wire passes before being wound upon a take-up reel 55. The capstan 54 and the take-up reel 55 are driven from suitable power sources (not shown).

In the operation of the apparatus, the conductor 11 is drawn from the reel 10 over the sheave 12 and then is advanced through the extrusion head 14 in which a sheath of rubber is extruded around the conductor. From the extruding mechanism the rubber covered conductor 11 passes into the vulcanizing chamber 18 wherein the rubber sheath is vulcanized, and is withdrawn through the seal 21.

The conductor 11 enters the seal 21 through the opening in the plug 37, which opening is just large enough to permit the passage therethrough of irregularities on the rubber covered conductor. Steam enters the seal 21 through the space between the conductor 11 and the wall of the opening in the plug 37 and immediately condenses upon contacting the cold water supplied by inlet pipes 29 and 33. When the steam condenses, it no longer exerts a noticeable pressure and gives up heat to the surrounding water. A valve (not shown) regulates the flow of water through the outlet pipe 30 so that all of the water supplied by the inlet pipe 29 and a part of the water supplied by the inlet pipe 33 drains through the pipe 30. Since at least part of the water supplied by pipe 33 flows to the right toward the outlet pipe 30, none of the water heated by the condensation of the steam circulates past the outlet pipe 30. Therefore, the temperature of the water in the seal 21 from the pipe 33 to the exit end of the seal 21 is substantially the same as that of water in the supply pipes. As the water circulates from the inlet pipe 33 through the thin-edged apertures 31—31 in the baffles 25—25 to the outlet at the left end of the seal 21, the pressure of the water is gradually decreased while the velocity at which it passes through the apertures 31—31 is increased, so that the pressure of the water within the chamber 24 immediately adjacent to the end plate 42 is almost the same as that of the atmosphere surrounding the seal.

As the rubber covered conductor 11 passes through the seal 21, its temperature is lowered greatly by the cooling effect of the water contained therein, so that by the time the rubber covered conductor 11 leaves the seal, it has been cooled sufficiently to prevent the "blowing" of the rubber insulation when it enters the atmosphere. In addition, the gradual reduction of pressure in the seal due to the passage of the water through the apertures having low coefficients of discharge obviates the sudden release of pressure which was found undesirable in some instances in connection with the previously mentioned rubber seal.

It is of particular importance that applicants' seal, even when supplied with water from an ordinary water tap having pressure generally of about 45 pounds per square inch, functions effectively and efficiently as a seal for a vulcanizing chamber in which the vulcanizing medium may be under a pressure as high as 250 pounds per square inch. Pumps for generating 150 to 250 pounds of water pressure, which were needed for the water seals in the prior art, are costly and require additional floor space. Also, specially formed fittings and piping are required to convey the water under such a high pressure to the seal. Applicants' device does away with the necessity of such a water pump and special fittings and may be operated with the use of fittings generally used to convey water at ordinary pressures. In addition, applicants' device will have a longer life and will be less expensive to keep in repair than seals requiring a high water pressure, because the high pressure used in the seals of the prior art greatly increases the continual tension exerted by the water on the seal and causes frequent leaks.

A number of changes may be made in the above described embodiment of the invention without departing from the invention. The vulcanized sheath need not be made of rubber but may be made of any suitable vulcanized compound. The invention is not limited to the treatment of covered metallic articles, but applies also to the continuous vulcanization of rubber strips or other shapes of solid rubber masses. Any cooling liquid that may be conveniently used in conjunction with the vulcanizing medium may be used in place of the water in the seal. These and other modifications will be apparent to those skilled in the art.

What is claimed is:

1. In a continuous vulcanizing apparatus including a vulcanizing chamber and means for supplying a condensable vulcanizing medium under high pressure to the vulcanizing chamber, a seal for the end of the vulcanizing chamber which comprises a cylinder, a plurality of centrally apertured spaced baffle plates positioned in the cylinder, a plurality of inlet pipes for supplying water to the cylinder, one of said inlet pipes being located nearer the end of the seal adjacent to the vulcanizing chamber than another of said inlet pipes, and spaced outlets for providing a continuous flow of water through the container, one of said outlets being near the end of the cylinder adjacent to the vulcanizing chamber in order to provide an accelerated flow of water at said end of the cylinder, whereby any of the vulcanizing medium which enters the cylinder is condensed and carried away immediately.

2. In a continuous vulcanization apparatus including a vulcanizing chamber supplied with steam under high pressure and means for advancing a continuous length of vulcanizable material through the vulcanizing chamber, a seal for the end of the vulcanizing chamber which comprises a tube, means for supplying cold water under lower pressure than that of the steam to the tube, a plurality of spaced baffle plates so positioned in the tube as to divide the tube into a plurility of compartments and having aligned thin-edged apertures therein to provide a passage for the vulcanizable material and to gradually reduce the pressure of the water in the tube, and an outlet associated with the tube at a point adjacent to the vulcanizing chamber for causing an accelerated flow of water at that end of the tube, whereby any steam which enters the tube is condensed and carried away immediately.

3. In an apparatus for making sheathed articles including means for covering a continuous core with a vulcanizable rubber composition, a chamber for continuously vulcanizing the covering on the core, means for supplying a vulcanizing medium under high pressure to the vulcanizing chamber, and means for continuously advancing the core through the apparatus, a seal for the exit end of the vulcanizing chamber which comprises a container, a plurality of inlet pipes for supplying water to the container under a pressure substantially less than that of the vulcanizing medium in the vulcanizing chamber, one of said inlet pipes supplying water to the container near the end adjacent to the vulcanizing chamber and another of said pipes supplying water to the container near the center thereof, a plurality of baffles so positioned within the container as to divide it into a plurality of compartments and having thin-edged apertures having low coefficients of discharge located centrally thereof, and spaced outlets for providing a continuous flow of water through the container, one of said outlets being positioned near the end of the container adjacent to the vulcanizing chamber to provide an accelerated flow of water at that end of the container, whereby any of the vulcanizing medium which enters the container is condensed and carried away immediately.

4. In a continuous vulcanizing apparatus including a vulcanizing chamber to which is supplied a vulcanizing medium under a high pressure, a seal which comprises a container, means to supply the container with a sealing fluid under a low pressure, an outlet positioned near the end of the container adjacent to the vulcanizing chamber to cause an accelerated flow of a portion of the sealing fluid through that end of the container, whereby any of the vulcanizing medium which enters the container is carried from the container immediately, and a plurality of spaced baffle plates positioned within the container and having thin-edged apertures therein to reduce the pressure of the sealing fluid which does not pass out of said outlet.

5. The process of making sheathed articles, which comprises passing a core covered with a vulcanizable sheath through a vulcanizing chamber, supplying steam under a high pressure to the vulcanizing chamber to vulcanize the sheath on the core, withdrawing the sheathed core from the vulcanizing chamber through a sealing zone, passing water under a low pressure through the sealing zone whereby the steam is prevented from escaping into the atmosphere, and gradually reducing the pressure of a portion of the water as it passes through the sealing zone.

6. The process of withdrawing a continuous length of a vulcanized material from a vulcanizing zone supplied with steam under high pressure, which comprises continuously withdrawing the vulcanized material from the vulcanizing zone through a sealing zone, continuously introducing cold water into the sealing zone at a pressure substantially less than that of the steam to simultaneously cool the material and retain the steam in the vulcanizing zone, causing a portion of the water to pass through the initial part of the sealing zone at a rapid rate to condense and remove any steam escaping from the vulcanizing zone, and causing the balance of the water to pass through the remaining part of the sealing zone at a reduced rate and simultaneously gradually reducing the pressure thereof to substantially atmospheric pressure.

7. In a continuous vulcanizing apparatus including a vulcanizing chamber to which steam is supplied under a high pressure, a seal for the end of the vulcanizing chamber which comprises a container providing a sealing chamber, means for supplying a sealing fluid to the sealing chamber at a temperature lower than the condensation temperature of the steam and under a pressure lower than that of the steam, and an outlet positioned near the end of the container adjacent to the vulcanizing chamber for causing an accelerated flow of the sealing fluid through that end of the container, whereby any steam which enters the sealing chamber is condensed and carried away immediately.

8. In a continuous vulcanizing apparatus including a vulcanizing chamber to which steam is supplied under a high pressure, a seal for the vulcanizing chamber, which comprises an elongated tube positioned adjacent to an end of said vulcanizing chamber and in alignment with said chamber, an inlet pipe connected to the tube near the end thereof adjacent to said chamber for supplying water to the tube, a second inlet pipe connected to the tube at a point farther removed from said chamber than said first-mentioned inlet pipe for supplying additional water to the tube, an outlet pipe positioned between said inlet pipes for withdrawing rapidly from the tube a portion of the water supplied by said inlet pipes, whereby any steam which enters the tube is condensed and carried away immediately, and a plurality of baffle-plates spaced throughout the container for progressively decreasing the pressure of the water passing therethrough from that which it possesses upon entering the tube to substantially atmospheric pressure.

DARYL R. DE ROCHE.
DONALD D. JONES.